Feb. 18, 1969     I. W. NOLTE     3,428,888
ELECTRICAL CIRCUIT TESTER FOR TRACTOR-TRAILER CABLE
Filed Feb. 1, 1966     Sheet _1_ of 2

INVENTOR.
IRVIN W. NOLTE,
BY Linton and Linton
ATTORNEYS.

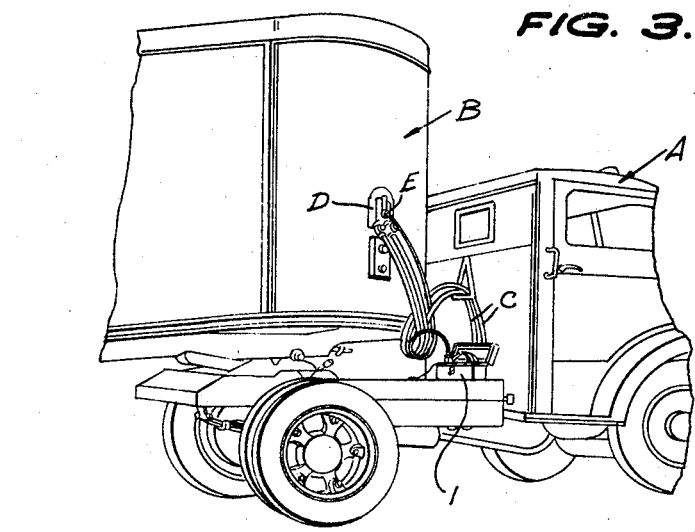
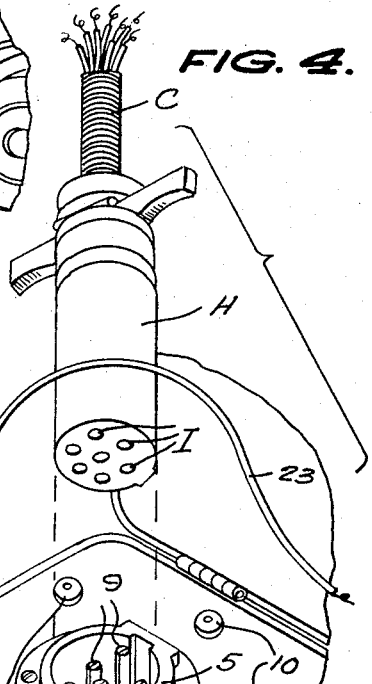
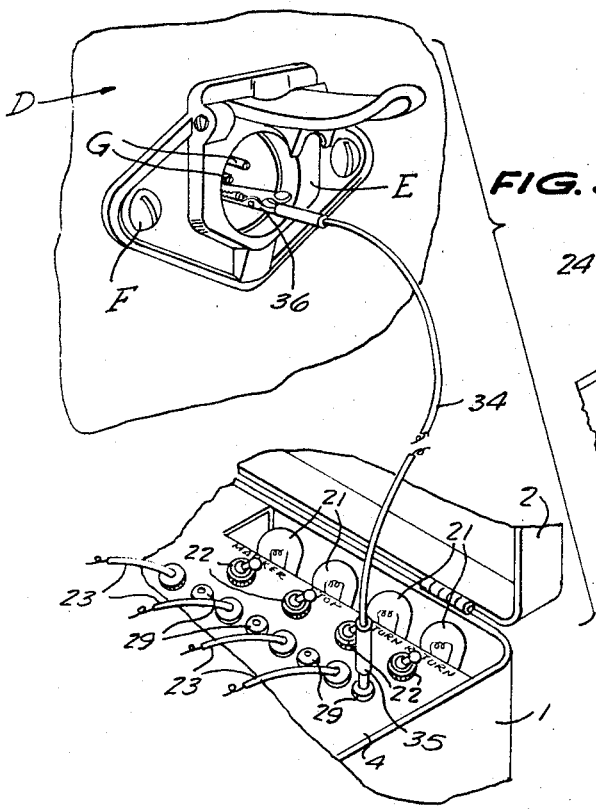

United States Patent Office 3,428,888
Patented Feb. 18, 1969

3,428,888
ELECTRICAL CIRCUIT TESTER FOR
TRACTOR-TRAILER CABLE
Irvin William Nolte, 348 Fairmont Ave.,
Wheeling, W. Va. 26003
Filed Feb. 1, 1966, Ser. No. 524,080
U.S. Cl. 324—51                                    7 Claims
Int. Cl. G01r 31/02

ABSTRACT OF THE DISCLOSURE

This invention relates to an apparatus for testing the continuity of electrical connections between a tractor and a trailer for lighting and control purposes. The trailer has a number of different lighting circuits such as stop, left turn, right turn, and marker, and the operativeness of each of these circuits must be checked. The usual cable connected between the tractor and the trailer is provided with a socket and a plug which engage corresponding parts on the tractor and the trailer, and the present testing apparatus tests the continuity of the circuits therein involved. Different trailers may have different kinds of load circuits and terminal connections and require different kinds of cable connections.

The testing apparatus provided is contained in a box mounted on the rear portion of the tractor. This includes different groups of sockets connected to a plurality of test indicating lamps, and to a two-range voltmeter, a plurality of resistances, and two-way switches for selectively inserting or removing the resistances in the circuit and selecting the desired range of the voltmeter. A number of different kinds of sockets are provided to receive different kinds of plugs on a particular cable. Plugs are connected to wires leading to each of the test indicating lamps. A plurality of sockets with pins are provided which are adapted to receive any particular one of a variety of different kinds of terminal plugs on the cable connecting the tractor and the particular trailer.

The test lamps and the voltmeter scales of the testing apparatus point out the location of any open circuits of imperfect high resistance connections.

---

The present invention is directed to a portable tester for testing the electrical lighting circuits of tractor-trailers.

Tractor-trailers as currently in use consist of a tractor or drawing vehicle containing a source of electrical current such as a battery, switches and cables connected thereto, while the trailer or van carries the lights such as right turn and left turn signal lights, stop lights, clearance lights, marker lights, auxiliary lights, and a ground connection. These tractor-trailers are detachable from each other and reattachable so that a given tractor can be employed for pulling different trailers from time to time, several different cables are provided, one of which is to be connected and carried by the tractor for operating and controlling the lights on the trailer on each cable has a plug which is detachably insertable into a socket carried by the particular trailer in use which sockets may be of various configurations to correspond to the circuits of the particular trailer, but contain pins or poles each connected to one of the lighting circuits of the particular trailer. The plug and socket connectors for the trailer vary in that they are of different shapes and contain 4, 6 or 7 poles or pins depending upon the number of light circuits on the trailer. Thus, the tractor cable plug used on a given occasion is designed for mating with a particular socket on the particular trailer in use and said tractor cable plugs have a number of recesses for receiving the pins of the socket for which they are intended.

The tractor cable as well as the wires, switches and connectors of both the tractor and trailer light systems are subject to considerable vibration, movement and exposure to the weather which can cause the lighting circuits to be defective so that the lights do not properly operate to their full capacity or only partially or not at all.

Therefore, it is desirable to be able to quickly, conveniently test these light circuits from time to time to determine their condition so as to be sure that all light systems are properly operable.

It is thus the principal object of the present invention to provide a portable and relatively small tester for the lighting circuits of tractor-trailers which is connectable to various types of tractor-trailer light circuits plugs and sockets for testing the condition of both the tractor and the trailer portions of said light circuits.

It is a further and important object of the present invention to provide a circuit tester for tractor-trailers which permits saving time and effort in locating light trouble in tractors or trailer units and also determining the voltage, if any, of the current passing through such circuits.

Further objects of the invention will be in part pointed out and in part obvious from the following description and the accompanying drawings in which:

FIG. 3 is a partial view of a tractor-trailer with the tester apparatus mounted for use.

FIG. 4 is an enlarged exploded perspective view of a tractor plug and connecting parts and;

FIG. 5 is an enlarged exploded perspective view showing a portion of a trailer apparatus and the tractor tester apparatus as connected for testing purposes.

Figure 1:
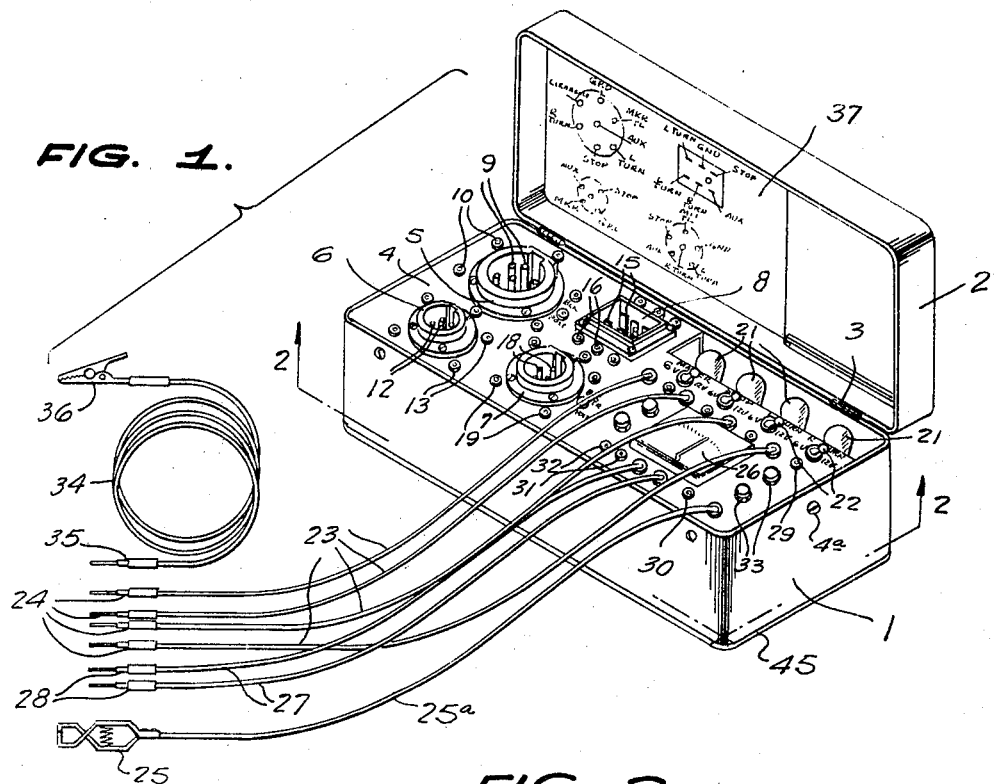
FIG. 1 is a perspective assembled view of the present circuit tester apparatus.

Referring now more particularly to the accompanying drawings wherein like and corresponding parts are indicated by similar reference characters, numeral 1 indicates for the testing apparatus an open top box preferably of an electrical current conducting material such as a metal and having a top 2 connected by hinges 3 to said box. A mounting top plate 4 is mounted within and extends across the open top of box 1 and is detachably connected thereto by screws 4a at each end. Box 1 is mounted on the rear of the tractor, and an electrically insulating pad affixed to the bottom of said container is shown at 45.

Plate 4 supports sockets 5, 6, 7, and 8 which are fixedly mounted on and extend through said plate. Each of said sockets corresponds to a particular kind of conventional trailer socket with socket 5 being a 7 pole socket, socket 6 being a 4 pole socket, socket 7 being a 6 pole socket, and socket 8 also a 6 pole socket. Said sockets correspond to the different conventional connecting sockets as currently in use upon trailers and for example correspond to sockets as are produced by the Berg Manufacturing Co., of Chicago, Illinois or the Cole-Hersee Co., of Boston, Mass.

Socket 5 includes seven poles or pins 9, while seven smaller sockets 10 are mounted on and extend through plate 4 around socket 5, and wires 11 (FIG. 2) connect each socket 10 to one of the pins or poles 9.

With regard to socket 6 which contains four poles 12, four smaller sockets 13 are mounted on and extend through plate 4 around socket 6 and are each connected by a wire 14 (FIG. 2) to one of the poles 12 of socket 6.

With reference to socket 8 this socket contains six pins, 15 (FIG. 2) and six smaller sockets 16 are mounted on and extend through plate 4 adjacent socket 8 with connecting wires 17 connecting each smaller socket 16 to a pole 15.

Socket 7 has six poles 18 with smaller sockets 19 mounted on and extending through plate 4 around socket 7. Connecting wires 20 (FIG. 2) connect each pole 18 to a small socket 19.

Four low voltage indicator lamps 21, for example, each of a 6 volt rating, are detachably mounted in sockets (not shown) mounted on a recessed portion of plate 4 and have one terminal connected to metal container 1. In front of each lamp 21 there is mounted a double pole, single throw switch 22 supported by plate 4.

Four wires 23 extend through mounting plate 4 each in front of one of said lamps 21 and each said wire has an end plug 24.

Alligator type clamp 25 is connected to a wire 25a extending through plate 4 and is connected at 44 (FIG. 2) by wire 43 to the body of metal container 1.

A two-range voltmeter 26 is also mounted in plate 4 with its dial exposed thereabove, and wires 27 are connected to said voltmeter and each having an end plug 28. Said voltmeter is designed with a scale which extends from 1 up to 12 volts on the left hand half thereof, zero reading center and from 1 to 12 volts on the right hand half.

A series of small sockets 29 are mounted on and extend through plate 4 with each socket 29 positioned in front of one of said lamps 21 and connecting with wires 23 forming a series of sockets.

Figure 2:
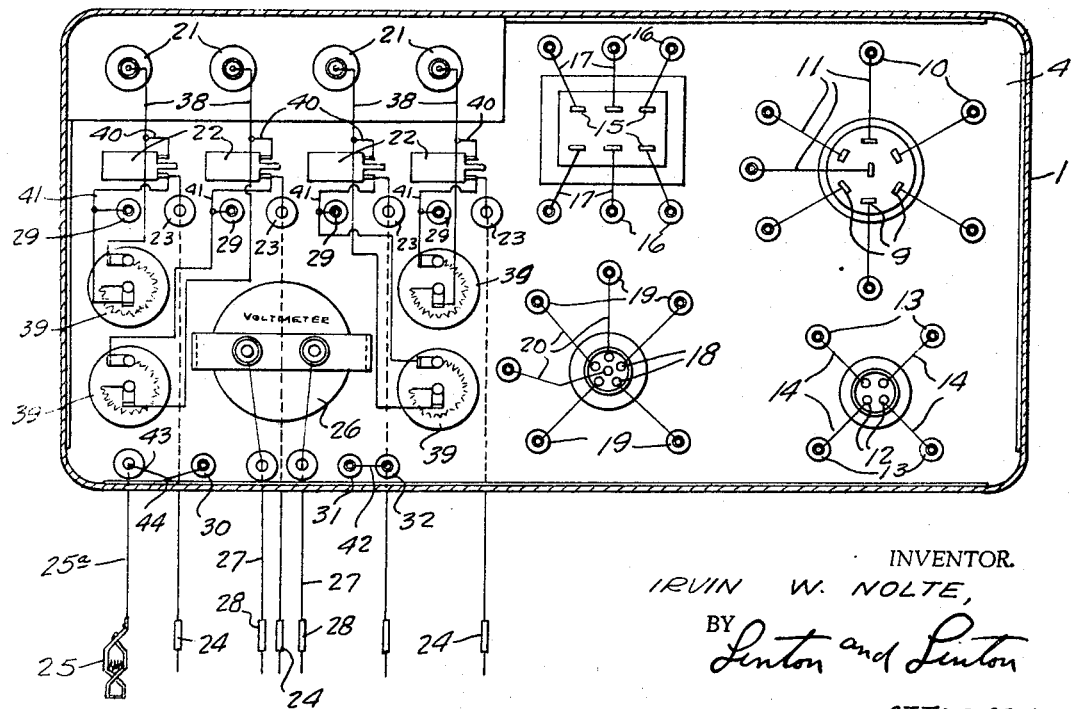
FIG. 2 is an enlarged diagrammatic view of the electrical circuit of said tester.

Near voltmeter 26 is positioned a small socket 30 mounted on and extending through plate 4 and likewise grounded and connected likewise 25a by screw 44 to the body of metal container 1. Also in front of said voltmeter are a pair of small sockets 31 and 32 mounted on and extending through plate 4 and connected together by wire 42 (FIG. 2).

A plurality of wires 38 (FIG. 2) each connect one terminal of one of said lamps 21 to one of four fixed resistors 39 attached by bolts 33 to plate 4.

Four wires 40 (FIG. 2) each connect one of said lamps 21 to one of the marker light or lamp switches 22. Four wires 41 each connect one of said switches 22 to one of said resistors 39, and each of said sockets 29 are connected to one of said wires 41. Each of said connecting wires 23 are also connected to one of said wires adjacent to a switch 22.

A connecting separable wire 34 having an alligator type clamp 36 at one end and a plug 35 to the opposite end is used with the tester in a manner to be explained more fully hereinafter.

In FIG. 3 of the drawing, there is shown the connected portions of a conventional tractor-trailer with A generally designating the tractor or towing vehicle which contains a traction motor, battery, switches for operating the electrical circuits and having box 1 mounted on its rear, and B generally indicates a trailer which carries lighting circuits such as stop lights, right and left turn indicator lights, clearance lights, marker lights, auxiliary lights, and the ground connection or lead. Said lights on the trailer are each electrically connected to a pole G (FIG. 5) of a socket E fastened by screws F to the front D of the trailer. Socket E corresponds to either socket 5, 6, 7, or 8 (FIG. 1) of the present tester. Cable C extends between the tractor and the trailer and contains the various wires which are connected to the various switches and controls of said lighting circuits as carried by tractor A and cable C is connected at one end to a plug H (FIG. 4) capable of mating with a trailer socket E so that the recesses I of said socket H each receive a pin or pole G detachably connecting the control switches of tractor A to the light circuits of trailer B. There may be several plugs having different numbers of poles any one of which plugs may be attached to cable C. The tractor has a socket with pins respectively connected to the battery and control switches of the tractor, and in normal operation when not testing, the plug H is inserted into this socket.

In order to test the circuits contained in and connected to cable C, a plug H is inserted in the one of the sockets 5, 6, 7, or 8 designed to receive the same. As an example, only, a seven pole cable plug H is shown in FIG. 4 to be inserted in socket 5 with poles 9 each mating with the recess I. However, it is to be appreciated that on a particular occasion plug H may be of a design having a number of pins for mating with either of the sockets 6, 7, or 8 as well, or said sockets and plug H as well as socket E may be of other conventional designs.

With plug H inserted in socket 5, it is possible to test separately and independently each of the circuits connected to the recesses I.

For this purpose, chart 37 mounted in cover 2 (FIG. 1) shows the poles of each of the sockets 5-8 with markings indicating the pole corresponding to a particular circuit of cable C. Thus for example, to test the marker light circuit of the tractor A, an end plug 24 of conductor 23 (FIG. 2) is inserted in a small socket 10 which corresponds to the marker light pole as indicated by chart 37. Also by throwing the marker light switch 22 in the tractor to the on position, current should pass through the particular wire 23 as indicated in FIG. 4 to the lamp 21 connected to that particular wire. If the marker light circuit of the tractor is operating properly, the appropriate indicator light 21 should light up, but if the light is weak indicating a low voltage.

Since the lamps 21 on the test set are of a 6 volt rating, and since terminals 25 and 24 may be connected to a 12 volt source on the tractor, it may become necessary in such case to adjust resistors 39 to reduce the voltage applied to lamps 21 to six volts. If two pole switch 22 is thrown one way, the apparatus is connected directly to operate with a six volt source on the tractor. If two pole switch 22 is thrown the other way, the apparatus is connected through resistor 39 to operate with a twelve volt source on the tractor.

Thus if the lamp 21 does not fully glow brightly, the circuit voltage can be tested by inserting one of the plug ends 28 into the socket 29 connected to the particular wire 23 being used, and inserting the other plug end 28 into the socket 30, and clamp 25 connected to a ground connection such as the front of tractor A for grounding the voltmeter. The voltmeter will then indicate the value of the applied voltage and if it shows a voltage lower than normal, that is less than 5½ volts on a 6 volt circuit or 11½ volts on a 12 volt circuit, this will indicate that the circuit is not properly operating.

To test the other circuits of cable C the other plug ends 24 can be inserted in the proper small socket 10 as indicated by chart 37, with the corresponding switch 22 set for either 6 or 12 volt circuits, and if the corresponding lamp 21 does not properly light, then the voltage thereon can be tested by inserting plug end 28 in the small socket 29 connected to that particular lamp.

If the circuits do not properly check, it would indicate that there is a fault in the circuit which could be caused by corroded connections in the battery terminal or other terminals of the circuit; defective fuse holder; defective switch or defective terminal block in the tractor; frayed or broken wires in cable C, or loose screws in plug H.

If plug H is of a design for mating with either particular socket 6, 7, or 8, then the plug ends or tips 24 are each inserted in one of the smaller sockets 13, 19, or 16 corresponding to the connected socket, and the tester then operated in the same manner as described above.

To test the light circuits connected to each of the pins or poles G of the socket E carried by the trailer B, plug H is connected to socket 9, for example, and clamp 36 or separable connecting wire 34 is attached to each one of the poles G in turn with the end plug 35 inserted in the corresponding one of the sockets 29 as shown by chart 37. The corresponding particular wire 23 is connected to the corresponding small socket 10, for example, as shown by chart 37, and current is passed from the tractor by closing the corresponding light switch 22 therein. Thus the corresponding light 21 should light to show that the circuit connected to the connected pin or pole G is properly functioning. An example of the connection of the separable connecting wire 34 for this purpose is shown in FIG. 5.

At the same time by inserting one terminal tip or plug 28 (FIG. 1) in small socket 30, and by grounding connection clamp 25 such as to the front of the trailer B, and touching the other plug or tip 28 to the pin or pole G of socket E being tested, this will give the voltage under load with the trailer lights burning.

The present invention is capable of considerable modification and such changes thereto as come within the scope of the appended claims is deemed to be a part thereof.

I claim:

1. An electrical system tester apparatus for tractor-trailers having a detachable plug and socket connection for the electrical lighting systems thereof comprising a portable current conducting container, a battery mounted on said tractor, said apparatus comprising at least one principal socket corresponding to the socket of a particular tractor-trailer being tested and capable of receiving the tractor-trailer electrical lighting principal system plug, said principal socket having a plurality of pin holes each for at least one particular light of the tractor-trailer lighting system and being mounted in said container, a first series of auxiliary sockets mounted in said container and each electrically connected to one of said first mentioned socket poles of said principal socket, a plurality of test indicating lights mounted in and connected to said container, a plurality of auxiliary plugs capable of mating with one of said series of auxiliary sockets, a plurality of flexible wires each connected to a corresponding one of said auxiliary plugs and to one of said indicating lamps for at times selectively connecting one of said poles of said principal socket to one of said lamps when the tractor-trailer principal plug is inserted in said first mentioned principal socket and the corresponding one of said plurality of auxiliary plugs is inserted in the one of said first series of auxiliary sockets connected to the pole for indicating the condition of the tractor-trailer lighting system connected to the pole, and a ground connection connected to said container, and providing a closed loop for testing.

2. An electrical system tester for tractor-trailers having a detachable plug and socket connection for the electrical lighting system thereof as claimed in claim 1, including a plurality of resistors each having one terminal electrically connected to one of said lamps and another terminal connected to one of said flexible wires, and a plurality of double pole single throw switches each having one terminal connected to one of said flexible wires and one terminal of its connected resistor and having another terminal connected between the other terminal of said resistor and its connected lamps whereby operation of each said switch will vary the circuit resistance and the required operating current of the lamp connected thereto.

3. An electrical system tester for tractor-trailers having a detachable plug and socket connection for the electrical lighting system thereof as claimed in claim 1, including a plurality of said first mentioned principal sockets each having a different pole arrangement and capable of receiving a different type of tractor-trailer electrical lighting system plug, and a plurality of said series of auxiliary sockets with each series surrounding one of said first mentioned principal sockets and having each said series socket thereof electrically connected to one of the poles thereof.

4. An electrical system tester for tractor-trailers having a detachable plug and socket connection for the electrical lighting system thereof as claimed in claim 1, including a further second series of auxiliary sockets each electrically connected to one of said flexible wires, a two range voltmeter mounted in said container, a pair of connecting plugs one of which is capable of insertion in each one of said further series of sockets and is electrically connected to said voltmeter, a grounded terminal socket electrically connected to said container, and the other of said pair of connecting plugs being electrically connected to said voltmeter and capable of insertion in said grounded terminal socket.

5. An electrical system tester for tractor-trailers having a detachable plug and socket connection for the electrical lighting system thereof as claimed in claim 1, and an electrically insulating pad affixed to the bottom of said container for insulating the same.

6. An electrical system tester for tractor-trailers having a detachable plug and socket for the electrical lighting systems thereof and the circuits thereof and which socket has a plurality of poles each for a separate one of the circuits of said lighting system, comprising a container, a two-range voltmeter mounted in said container, a pair of auxiliary electrically connected sockets mounted in said container, a tractor-trailer socket mounted on said tractor, a further socket mounted in said container, means for connecting said further socket to a source of electrical current, a clamp type connector for connection to each pole of the tractor-trailer socket, an end plug capable of insertion in one of said pair of sockets, means electrically connecting said connector and said end plug, and a pair of plugs electrically connected to said voltmeter and each capable of insertion in either of said pair of auxiliary sockets and said further socket.

7. In a testing system for testing the condition of the circuits of a tractor-trailer combination, a tractor having a battery and control switches circuit arrangement, a trailer having a plurality of lighting circuits, said trailer being provided with a socket having a plurality of terminal pins respectively connected to its said circuits, said tractor being provided with a socket having a plurality of terminal pins respectively connected to its said circuit arrangement, the sockets of said tractor circuit arrangement and said trailer being provided with different numbers of pins for different trailers and different tractors according to the particular circuits of said particular tractor and said particular trailer being used, and a plurality of cables each provided at each end with a terminal connecting plug, and the terminal plugs of different ones of said cables being respectively adapted to connect respectively with different ones of the different sockets on various ones of said tractors and said trailers, a testing set having a plurality of different kinds of test sockets respectively having pins adapted to receive and connect the different kinds of terminal plugs carried on different ones of said cables, a plurality of primary auxiliary sockets respectively connected to the pins of the different ones of said test sockets, a plurality of test lamps, a plurality of secondary auxiliary sockets respectively connected to said test lamps, and a plurality of test connectors respectively provided with terminal connectors, and said connectors being selectively connectable to desired ones of the pins of said sockets, whereby the continuity of the circuits of said tractor and trailers and cable may be readily determined.

References Cited

UNITED STATES PATENTS

| | | | |
|---|---|---|---|
| 2,023,947 | 12/1935 | Auble | 324—23 |
| 2,030,857 | 2/1936 | Dingley | 324—73 XR |
| 2,705,773 | 4/1955 | Ward | 324—73 |
| 2,994,819 | 8/1961 | Vincent | 324—51 |
| 3,103,808 | 9/1963 | Eichelberger | 324—51 XR |
| 3,305,772 | 2/1967 | Earnhart | 324—51 |

RUDOLPH V. ROLINEC, *Primary Examiner.*

G. R. STRECKER, *Assistant Examiner.*